United States Patent
Otani et al.

(10) Patent No.: US 8,224,030 B2
(45) Date of Patent: Jul. 17, 2012

(54) POSITION MEASURING METHOD AND POSITION MEASURING INSTRUMENT

(75) Inventors: Hitoshi Otani, Itabashi-ku (JP); Kaoru Kumagai, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 227 days.

(21) Appl. No.: 12/825,750

(22) Filed: Jun. 29, 2010

(65) Prior Publication Data

US 2011/0158475 A1 Jun. 30, 2011

(30) Foreign Application Priority Data

Jul. 17, 2009 (JP) .................................. 2009-168646

(51) Int. Cl.
 *G06K 9/00* (2006.01)
(52) U.S. Cl. ....................................................... 382/103
(58) Field of Classification Search .................. 382/103, 382/284; 348/135; 701/523
See application file for complete search history.

(56) References Cited

U.S. PATENT DOCUMENTS

| | | | |
|---|---|---|---|
| 7,552,025 B2 | 6/2009 | Ohtomo et al. | |
| 7,726,033 B2 * | 6/2010 | Ohtomo et al. | 33/275 R |
| 8,077,197 B2 * | 12/2011 | Ohtomo et al. | 348/135 |
| 2007/0167154 A1 | 7/2007 | Ohtomo et al. | |

FOREIGN PATENT DOCUMENTS

| | | |
|---|---|---|
| JP | 2001-317915 A | 11/2001 |
| JP | 2007-171048 A | 7/2007 |
| JP | 2007-248156 A | 9/2007 |
| WO | 99/53335 A1 | 10/1999 |

OTHER PUBLICATIONS

European communication, dated Nov. 5, 2010, in corresponding foreign application EP 10169555.9.

* cited by examiner

*Primary Examiner* — Claire X Wang
(74) *Attorney, Agent, or Firm* — Nields, Lemack & Frame, LLC

(57) ABSTRACT

The present invention provides a position measuring instrument, comprising a GPS position detecting device 7, an image pickup device 9 for continuously taking a digital image, a laser distance measuring device 8, and a measuring instrument main unit 2, wherein the GPS position detecting device measures positional data at a first point and a second point, the image pickup device continuously takes digital images on sceneries in surroundings during a process where the image pickup device moves from the first point, which is a known point, via the second point to a third point, which is an unknown point, the laser distance measuring device measures a distance to the object of image pickup in parallel to the image pickup by the image pickup device, and the measuring instrument main unit generates tracking point from the image obtained at the first point, sequentially identifies the tracking points from the tracing of points generated on the images to be acquired continuously, calculates three-dimensional positional data of the tracking points of the images acquired at the first point and the images acquired at the second point from the positional data at the first point and the second point, compares the result of calculation with the result of distance measurement by the laser distance measuring device, adopts the result of calculation within a predetermined limit of errors with respect to the measurement results as positional data of the tracking point, and calculates positional data of the third point from the positional data of the tracking point.

8 Claims, 12 Drawing Sheets

——————— METHOD OF INTERSECTION
----------- METHOD OF RESECTION

POSITION MEASURING METHOD AND POSITION MEASURING INSTRUMENT

BACKGROUND OF THE INVENTION

The present invention relates a position measuring method and a position measuring instrument, by which it is possible to measure a position in GPS (a global positioning system) even when a position measurement by GPS cannot be performed.

In recent years, a position measurement using GPS has been propagated. For instance, when it is planned to carry out a civil engineering operation by using civil engineering and construction machineries such as bulldozer, an operating position, i.e. a position of the bulldozer, is determined by GPS, and the operating position is confirmed. Or, as in a case of a car navigator, electronic map information is linked with positional data obtained by GPS. Then, the present position of a vehicle is reflected on an electronic map and is turned to an image, and this image is displayed on an image display device. Thus, a position of a mobile object can be measured at real time.

However, radio waves from satellite are used in the position measurement by GPS. There are often places (shade) where radio waves cannot reach because radio waves from the satellite are interrupted by obstacles, for instance, mountain or building. Or, like the case of the car navigator, for which a range of position measurement is not clearly determined, there are often shades where radio waves do not reach.

For the range where the position measurement by GPS cannot be carried out, it has been practiced in the past that position measurement had to be continued by a surveying operation of man power by using a conventional type surveying instrument.

In the case of a car navigator etc., which is installed on the mobile object, the position measurement cannot be performed on the portion of the shade, and satisfactory function could not be fulfilled as the position measuring instrument.

In this respect, JP-A-2007-171048 discloses an interpolation method on positional data when the position measurement cannot be carried out by GPS. According to the interpolation method disclosed in JP-A-2007-171048, for the range where the position measurement cannot be performed by GPS, sceneries in surroundings are taken continuously as digital images during a process where the mobile object is moved. Then, tracking points are generated in the digital images thus acquired. The tracking points are traced in the images, which are continuously acquired. The tracking points are sequentially identified on the images acquired. Then, from results of orientation of the tracking points at a first point and at a second point and from positional data at the first point and the second point, which are already known by GPS position measurement, three-dimensional positional data of the tracking point is determined (a method of intersection). Based on a result of orientation of the tracking point acquired at a third point and on three-dimensional positional data of the tracking points, a position of the third point is sequentially determined (a method of resection).

By the positional data interpolation method according to JP-A-2007-171048, it is possible to perform the position measurement in a case where the GPS position measurement cannot be accomplished.

On the other hand, the positional data interpolation method according to JP-A-2007-171048 is based on conditions that continuous images can be acquired, that tracking of points between the images can be achieved, and that image surveying can be carried out. In actual position measuring operation, however, continuous image may not be acquired. For instance, in the position measurement under the condition where buildings are present along a road, if there is a space between buildings or if a building is lacking, the images cannot be acquired on the place where the building is not present, and tracking on the images cannot be achieved. Or, even when the tracking points are obtained in the images, there is no continuity in three-dimensional positional data of the tracking points, or three-dimensional positional data may vary widely. As a result, such trouble may occur that an accuracy of measurement of the position of the third point obtained according to the three-dimensional positional data in the images will be extremely lowered.

Further, there is a property that in procedure to perform the position measurement by repeating the method of intersection and the method of resection, measurement errors may be accumulated. Therefore, when a condition where the GPS position measurement cannot be performed for long time, reliability of the measurement is lowered.

SUMMARY OF THE INVENTION

It is an object of the present invention to provide a position measuring method and a position measuring instrument, by which it is possible to continuously perform a position measurement without decreasing a measuring accuracy when a GPS position measurement cannot be performed and under condition where continuous image cannot be acquired.

To attain the above object, the present invention provides a position measuring method for measuring a moving image pickup position and for measuring an object of image pickup from the image pickup position, wherein a method of intersection and a method of resection are alternately and repeatedly carried out, the method of intersection is used to continuously take digital images, to generate tracking point in the image, to perform tracking on moving image, and to measure coordinates of the tracking point from coordinates of the image pickup position used as a known point by calculation, the method of resection is used to measure the image pickup position after moving from coordinates of the tracking point obtained by calculation, comprising a step of measuring actually a distance to an object of image pickup by laser surveying in parallel to image pickup of the digital image, a step of comparing coordinates of the tracking point obtained by calculation with the distance obtained by actual measurement, and a step of acquiring a calculating coordinate as coordinate value of the tracking point in case the calculating coordinate obtained by calculation is within a predetermined limit of errors to the actually measured distance.

Also, the present invention provides the position measuring method as described above, further comprising a step of moving a plurality of points in up-to-bottom direction while performing laser surveying, and a step of setting a range of measurement for performing the tracking of the moving image. Further, the present invention provides the position measuring method as described above, further comprising a step of including road surface or ground surface in a part of the moving image to be taken, a step of extracting the tracking point also from images of the road surface or the ground surface, and a step of continuing tracking of the moving image by the images of the road surface or the ground surface when the object of image pickup is not present.

Also, the present invention provides a position measuring instrument, comprising a GPS position detecting device, an image pickup device for continuously taking a digital image, a laser distance measuring device, and a measuring instrument main unit, wherein the GPS position detecting device measures positional data at a first point and a second point, the image pickup device continuously takes digital images on sceneries in surroundings during a process where the image pickup device moves from the first point, which is a known point, via the second point to a third point, which is an unknown point, the laser distance measuring device measures a distance to the object of image pickup in parallel to the image pickup by the image pickup device, and the measuring instrument main unit generates tracking point from the image obtained at the first point, sequentially identifies the tracking points from the tracing of points generated on the images to be acquired continuously, calculates three-dimensional positional data of the tracking points of the images acquired at the first point and the images acquired at the second point from the positional data at the first point and the second point, compares the result of calculation with the result of distance measurement by the laser distance measuring device, adopts the result of calculation within a predetermined limit of errors with respect to the measurement results as positional data of the tracking points, and calculates positional data of the third point from the positional data of the tracking point.

Further, the present invention provides the position measuring instrument as described above, wherein the laser distance measuring device can perform measurements on a plurality of points in up-to-bottom direction at the same time or almost at the same time. Also, the present invention provides the position measuring instrument as described above, wherein the laser distance measuring device projects a plurality of pulsed laser beams with aligned along a line in up-to-bottom direction with a predetermined distance between them, and distance measurement is performed for each laser beam and for each pulse of each laser beam. Further, the present invention provides the position measuring instrument as described above, wherein the laser distance measuring device projects a single pulsed laser beam reciprocally in up-to-bottom direction for scanning, and measures distance for each pulse. Also, the present invention provides the position measuring instrument as described above, wherein the measuring instrument main unit sets up a range of measurement based on the result of measurement by the laser distance measuring device and carries out tracking on the moving image and measurement on the range of measurement.

The present invention provides a position measuring method for measuring a moving image pickup position and for measuring an object of image pickup from the image pickup position, wherein a method of intersection and a method of resection are alternately and repeatedly carried out, the method of intersection is used to continuously take digital images, to generate tracking point in the image, to perform tracking on moving image and to measure coordinates of the tracking point from coordinates of the image pickup position used as a known point by calculation, the method of resection is used to measure the image pickup position after moving from coordinates of the tracking point obtained by calculation, comprising a step of measuring actually a distance to an object of image pickup by laser surveying in parallel to image pickup of the digital image, a step of comparing coordinates of the tracking point obtained by calculation with the distance obtained by actual measurement, and a step of acquiring a calculating coordinate as coordinate value of the tracking point in case the calculating coordinate obtained by calculation is within a predetermined limit of errors to the actually measured distance. As a result, the data with low accuracy of coordinates of the tracking points obtained by calculation are exempted, and the decrease of the measuring accuracy can be prevented. Further, occurrence of cumulative errors in the method of intersection and the method of resection can be prevented, and it is possible to increase the accuracy in position measurement and to improve reliability.

Also, the present invention provides the position measuring method as described above, further comprising a step of moving a plurality of points in up-to-bottom direction while performing laser surveying, and a step of setting a range of measurement for performing the tracking of the moving image. As a result, it is possible to eliminate such type of the measurement operation, which is useless or not important, and it is possible to increase a measuring efficiency and to reduce the burden of the position measuring instrument.

Further, the present invention provides the position measuring method as described above, further comprising a step of including road surface or ground surface in a part of the moving image to be taken, a step of extracting the tracking point also from images of the road surface or the ground surface, and a step of continuing tracking of the moving image by the images of the road surface or the ground surface when the object of image pickup is not present. As a result, even when an object of image pickup may not be present, it is possible to prevent an occurrence of measurement error due to erroneous recognition of the tracking points, or to prevent interruption of the measurement, and the measuring efficiency is improved.

Also, the present invention provides the position measuring instrument as described above, comprising a GPS position detecting device, an image pickup device for continuously taking a digital image, a laser distance measuring device, and a measuring instrument main unit, wherein the GPS position detecting device measures positional data at a first point and a second point, the image pickup device continuously takes digital images on sceneries in surroundings during a process where the image pickup device moves from the first point, which is a known point, via the second point to a third point, which is an unknown point, the laser distance measuring device measures a distance to the object of image pickup in parallel to the image pickup by the image pickup device, and the measuring instrument main unit generates tracking point from the image obtained at the first point, sequentially identifies the tracking points from the tracing of points generated on the images to be acquired continuously, calculates three-dimensional positional data of the tracking points of the images acquired at the first point and the images acquired at the second point from the positional data at the first point and the second point, compares the result of calculation with the result of distance measurement by the laser distance measuring device, adopts the result of calculation within a predetermined limit of errors with respect to the measurement results as positional data of the tracking point, and calculates positional data of the third point from the positional data of the tracking point. As a result, the data with low accuracy of positional data on the tracking points as obtained by calculation can be exempted, and the decrease of the measuring accuracy can be prevented. At the same time, occurrence of cumulative errors can be prevented, and it is possible to increase the accuracy in position measurement and to improve the reliability.

Further, the present invention provides the position measuring instrument as described above, wherein the laser distance measuring device can perform measurements on a plurality of points in up-to-bottom direction at the same time or almost at the same time. As a result, it is possible to perform measurement of a distance to the object to be measured and to identify a surface of the object to be measured.

Also, the present invention provides the position measuring instrument as described above, wherein the laser distance measuring device projects a plurality of pulsed laser beams with aligned along a line in up-to-bottom direction with a predetermined distance between them, and distance measurement is performed for each laser beam and for each pulse of each laser beam. Because a plurality of points can be measured at the same time in up-to-bottom direction, a distance to the object to be measured can be determined and the surface of the object to be measured can be identified.

Further, the present invention provides the position measuring instrument as described above, wherein the laser distance measuring device projects a single pulsed laser beam reciprocally in up-to-bottom direction for scanning, and measures distance for each pulse. Because a plurality of points can be measured almost at the same time in up-to-bottom direction, a distance to the object to be measured can be determined and the surface of the object to be measured can be identified.

Also, the present invention provides the position measuring instrument as described above, wherein the measuring instrument main unit sets up a range of measurement based on the result of measurement by the laser distance measuring device and carries out tracking on the moving image and measurement on the range of measurement. As a result, it is possible to eliminate such type of the measuring operation, which is useless or not important, and it is possible to increase the measurement efficiency and to reduce the burden of the position measuring instrument.

DETAILED DESCRIPTION OF THE PREFERRED EMBODIMENT

Description will be given below on an embodiment of the present invention by referring to the attached drawings.

First, referring to FIG. 1 to FIG. 3, description will be given on a position measuring instrument according to the present invention.

Figure 1:
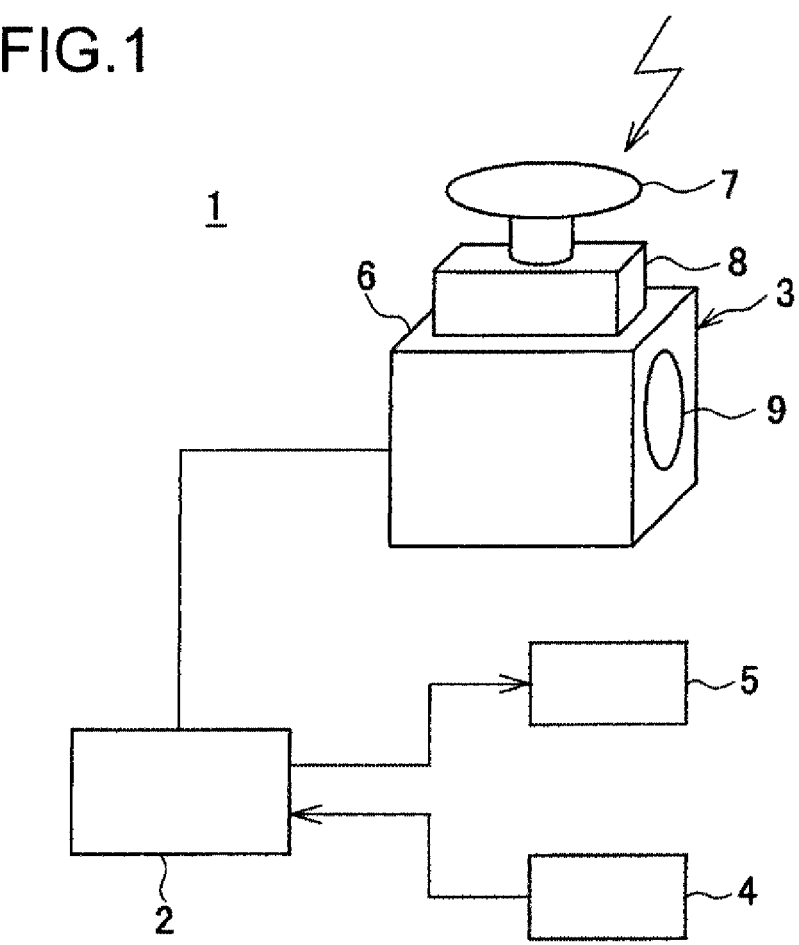
FIG. 1 is a schematical drawing to show a position measuring instrument according to an embodiment of the present invention.

FIG. 1 is a schematical drawing to show general features of a position measuring instrument 1. The position measuring instrument 1 primarily comprises a measuring instrument main unit 2, a position detecting device 3, an operation unit 4, and a display unit 5. The position detecting device 3 is installed at a position, which provides a fine view, such as on a roof of driver's cabin of a mobile object 25 such as bulldozer, automobile. The measuring instrument main unit 2, the operation unit 4, and the display unit 5 are installed at places, where an operator or a driver can easily operate and can visually recognize images, such as the driver's cabin. The operation unit 4 may be designed as a touch panel, or may be integrated together with the display unit 5.

Figure 2:
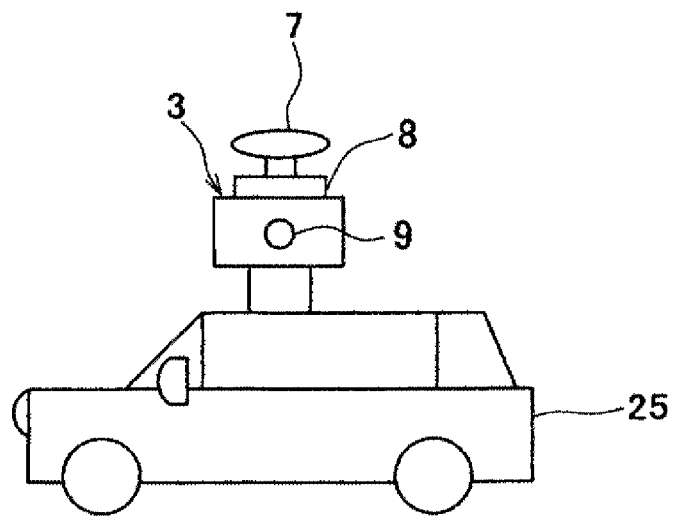
FIG. 2 is a schematical drawing to explain a condition where the embodiment of the present invention is carried out.

FIG. 2 shows a case where the position detecting device 3 is installed on the roof of the automobile, i.e. an example of the mobile object 25.

The position detecting device 3 comprises a GPS position detecting device 7 installed on an upper surface of a detecting device main unit 6, a laser distance measuring device 8, an image pickup device 9 installed on a side surface of the detecting device main unit 6, and an azimuth sensor 10 incorporated in the detecting device main unit 6. A distance measuring direction of the laser distance measuring device 8 and an optical axis of the image pickup device 9 are calibrated in advance. It is preferable that the laser distance measuring device 8 and the image pickup device 9 are integrated together under the calibrated status. For instance, the laser distance measuring device 8 is incorporated in the image pickup device 9.

The laser distance measuring device 8 is so arranged that a plurality of point laser beams are aligned with a predetermined distance between them in up-to-bottom direction and are projected in pulses, and that a distance between the laser distance measuring device 8 (i.e. the image pickup device 9) and an object of image pickup can be measured for each of the laser beams and for each of the pulses. The laser distance measuring device 8 may be so designed to project a pulsed laser beam reciprocally and vertically for scanning over a predetermined range and to measure a distance for each pulse so that a plurality of points can be measured in up-to-bottom direction at the same time or almost at the same time.

The image pickup device 9 is so designed to take moving images on both sides and perpendicular to a running direction of the mobile object 25. An all-round camera to take photographs in all-round directions (360°) may be used as the image pickup device 9. The image pickup device 9 is a digital image pickup device such as digital camera, digital video camera, etc., and the image pickup device 9 can output the images thus taken as digital image data. The image pickup device 9 comprises an image pickup element made up with a multiple of pixels, e.g. CCD sensor, CMOS sensor, etc. The image data of one frame of the image pickup element is made up as an assembly of signal of each pixel. By identifying a pixel to correspond to the signal, a position in the image can be identified. Mechanical relation between the image pickup device 9 and the azimuth sensor 10 is fixed. When the azimuth sensor 10 detects an azimuth, an image pickup direction (azimuth) of each image pickup device 9 can be uniquely determined.

The GPS position detecting device 7 comprises an azimuth sensor 10, a GPS antenna 11, and a GPS arithmetic unit 12 (see FIG. 3), and signals from a plurality of the satellites are received via the GPS antenna 11, and based on the received results, the GPS arithmetic unit 12 calculates a distance between the satellite and a receiving point in view of three-dimensional geometry, and three-dimensional position measurement is performed. As the position measurement, there are single position measurement, interference position measurement, etc. It is preferable that RTK (real time kinematic) position measurement is adopted, by which measurement can be made within a short time while moving.

The image pickup device 9 picks up images by photographing of moving images or picks up images at a predetermined time interval (e.g. at 30 image frames/second). In synchronization with the image pickup, position measurement by the GPS position detecting device 7 is carried out for every image frame. In synchronization with required times of the time interval (e.g. at the time interval each at 30 seconds) of image pickup time interval for each predetermined frame, position measurement by the GPS position detecting device 7 is carried out. The image data of a captured image of the picked-up images is associated with positional data obtained at the position detecting device 3 when the image is taken, and the result is sent to the measuring instrument main unit 2 and the result is stored in a data storage unit 18.

The result of distance measurement obtained at the laser distance measuring device 8 is matched (associated with) the image frame, which is taken at the same moment as the time of distance measurement, and the result is sent to the measuring instrument main unit 2 and is stored in the data storage unit 18.

The time interval of image pickup of the image pickup device 9 (or a predetermined frames interval) is set to such time interval that most part of the images taken are overlapped between the image frames adjacent in terms of time and that continuity of the images is not lost as a whole. If the speed of the mobile object 25 is high, the time interval of image pickup is shortened, and if the speed of the mobile object 25 is slow, the time interval of the image pickups may be longer. Or, it may be so arranged that the time interval of the image pickup is fixed so that the time interval corresponds to the maximum speed of the mobile object 25.

Similarly, when the speed of the mobile object 25 is high, the time interval of capturing as described above is set to 15 seconds interval, for instance, and when the speed of the mobile object 25 is slow, the time interval is set to 45 seconds interval, for instance, and the time interval of capturing may be adjusted. As to be described later, the images thus captured are used for image surveying.

Figure 3:
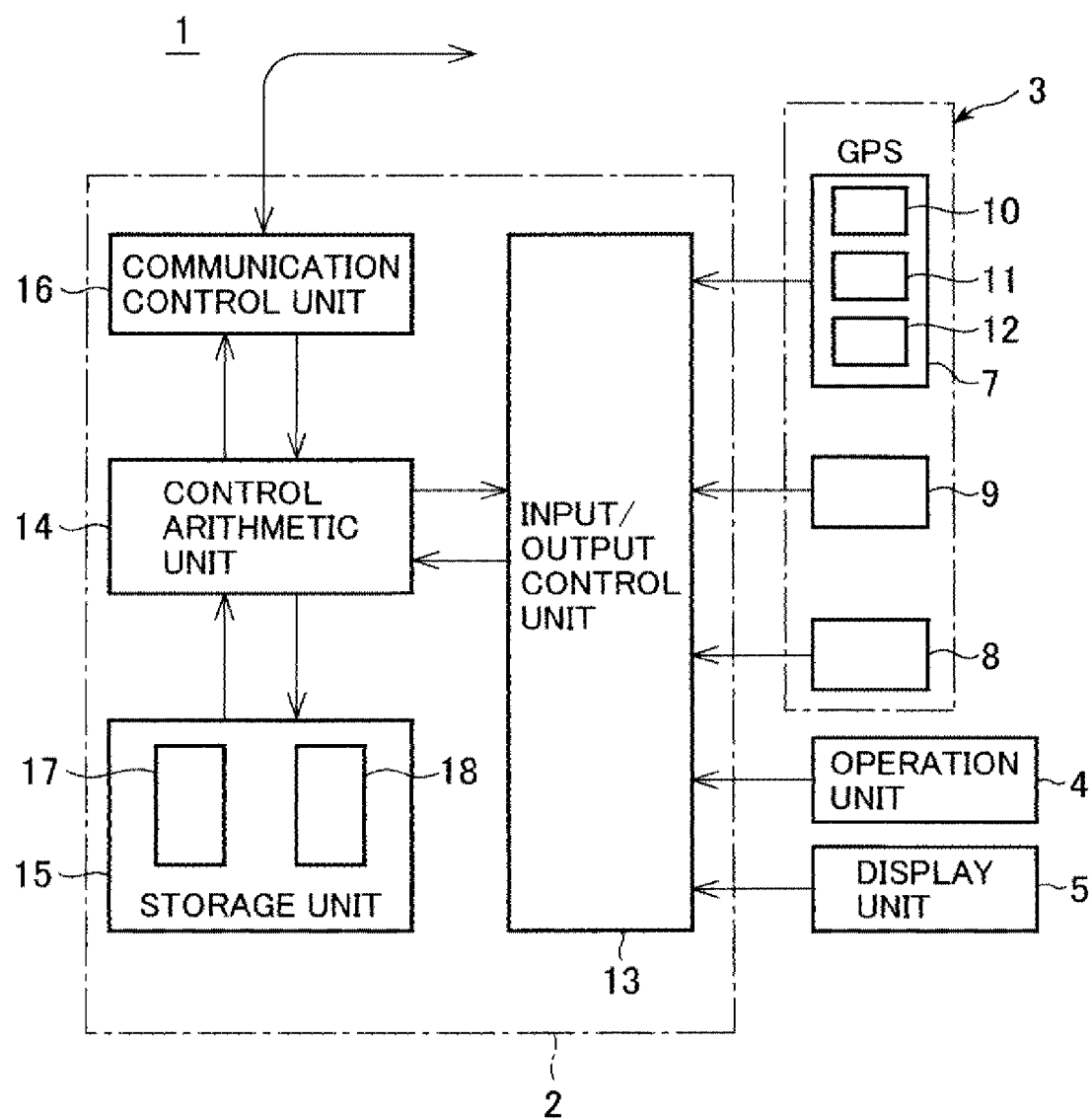
FIG. 3 is a schematical block diagram of the position measuring instrument according to the embodiment of the present invention.

Referring to FIG. 3, description will be given on the measuring instrument main unit 2.

The measuring instrument main unit 2 primarily comprises an input/output control unit 13, a control arithmetic unit 14 typically represented by CPU, a storage unit 15 represented by HD or the like, and a communication control unit 16, and others.

The storage unit 15 is a memory card, HD, FD, or MO etc., and is incorporated or removably attached. The storage unit 15 has a program storage unit 17 and the data storage unit 18. In the program storage unit 17, various types of programs are stored. These programs include: a sequence program for controlling operation of the device, an image processing program for extracting a tracking point from the image obtained, a calculation program for performing image matching between a plurality of images, and for performing the tracking of the tracking points between a plurality of images, a surveying program for calculating a position of unknown points in the images based on two three-dimensional positional data as obtained by the position detecting device 3 by means of the method of intersection and for calculating a position of the position detecting device 3 from at least two known points in each of two images by means of the method of resection, a transmission control program for transmitting the obtained results of measurement to external devices such as data collecting device, etc., a display program for displaying the result of position measurement on the display unit 5, and other programs.

In the data storage unit 18, data are stored such as image data acquired by the image pickup device 9, a position data of the position detecting device 3 when the image is taken, and a distance measurement data as measured by the laser distance measuring device 8. As described above, the positional data and distance measurement data are associated with the image data, and the image data are the data of time series.

Next, referring to FIG. 4, description will be given on general outline of operation of the embodiment of the present invention.

In case a position can be measured by the GPS position detecting device 7, the present position of the mobile object 25 is measured and identified according to the result of position detection by the GPS position detecting device 7. Further, in parallel with acquisition of position information by the GPS position detecting device 7 (Step 00), images in a direction perpendicular to the running direction (i.e. in the direction along the route) are continuously taken by the image pickup device 9 (Step 01). In the range of image pickup by the image pickup device 9, there are included: sceneries including the buildings along the route, and roads (road surfaces) where the mobile object 25 is driven as seen in the lower portion of the image.

Further, in parallel to the measurement by the GPS position detecting device 7 and to the image pickup by the image pickup device 9, distance measurement is performed on the object of image pickup in image pickup direction of the image pickup device 9 by the laser distance measuring device 8 (Step 11). The objects of image pickup include objects located along the route. For instance, the objects of image pickup are architectures such as buildings in case of urban area, and embankment or the like in case of suburban area.

As described above, the laser distance measuring device 8 projects a plurality of point laser beams aligned in up-to-bottom direction with a predetermined distance between them and projects as pulses, and distance measurement is performed for each laser beam and for each pulse. Therefore, when the mobile object 25 is driven, measurement can be made in a range, which is continuous in band-like shape with a width equal to a height as required.

On the images taken by the image pickup device 9, characteristic points are extracted by image processing. By tracking the extracted characteristic points between image frames, image tracking is carried out, and the image tracking is executed as long as the time period when the measurement is performed by the position measuring instrument 1 (Step 02).

Based on two-point positional data of the mobile object 25 as obtained by the GPS position detecting device 7, three-dimensional positional data is obtained by calculation by means of the method of intersection on the extracted characteristic points (Step 03).

When the three-dimensional positional data is obtained on the characteristics points (i.e. measuring points of the object to be measured), distances between the mobile object 25 and the characteristic points are calculated based on the three-dimensional positional data of the characteristic points and on the positional data of the mobile object 25. Then, the calculated distance is compared with the distance to the characteristic point as determined by the laser distance measuring device 8 (Step 04).

Even when the measuring point as measured by the laser distance measuring device 8 does not perfectly coincide with the position of the characteristic point, if the object to be measured is a wall surface of a building, there is almost no influence on the accuracy of the distance measurement.

When the calculated distance and a distance to the characteristic point actually measured by the laser distance measuring device 8 (hereinafter referred as an "actually measured distance") coincides with each other or when the calculated distance and the actually measured distance are within a predetermined limit of errors, e.g. within 10%, positional coordinates of the characteristic points as obtained by the method of intersection are regarded as correct, and the positional coordinates are stored in the data storage unit 18 together with the image.

When the characteristic point is in a space between buildings, or when an image cannot be obtained because the building is absent—that is, when the object of image pickup does not exist, or even when the image can be taken but distance varies widely, the characteristic point cannot be extracted even when the image can be obtained and tracking is unsuccessful, and the characteristic point may be erroneously recognized. Even if the tracking is successful, the accuracy is extremely lowered. Under such condition, in case where the calculated distance and the actually measured distance are compared with each other, the value is extremely different or the actually measured distance cannot be obtained. In such a case, the characteristic points and the calculated distance are removed as out of measuring object (Step 05). In case there is no characteristic point within the desired distance range (e.g. within 20 m; freely settable) from the actually measured distance as measured by the laser distance measuring device 8 or when it is regarded that there is no calculated distance, the characteristic point and the calculated distance can be also removed.

Therefore, there will be no characteristic point including errors, which will be a basis of the calculation by the method of resection as to be described later. As a result, the occurrence of cumulative error is prevented, and accuracy and reliability of the position measurement by the method of resection are improved.

Next, three-dimensional coordinates of the mobile object 25 after moving by the method of resection can be obtained by calculation based on the acquired characteristic point and also on three-dimensional coordinates of the characteristic point, which are within the limit of errors in comparison with the actually measured value. Specifically, the position of the mobile object 25, for which the position could not be measured by the GPS position detecting device 7, can be determined (Step 06).

As described above, three-dimensional positional data of the characteristic point (i.e. the measuring point of the object to be measured) is obtained by the method of intersection. Further, the position coordinates of the mobile object 25 at a next position moved according to the acquired three-dimensional coordinates of the characteristic points are determined by the method of resection. By repeating the method of intersection and the method of resection, even when position measurement cannot be accomplished at the GPS position detecting device 7, it is possible to perform position measurement of the mobile object 25 and further, it is possible to associate the image taken by the image pickup device 9 with the positional data.

Again, when it is turned to the condition where the GPS position detecting device 7 can receive signals from the satellite, a mode of position measurement is changed over to the mode of position measurement by the GPS position detecting device 7.

Next, referring to FIG. 5 and FIG. 6, more concrete description will be given on the image tracking in Step 02.

Based on the image processing program, the control arithmetic unit 14 performs image processing such as edge processing on an image data $I_1$ of the measuring position $P_1$ (hereinafter, the measuring position P is simply referred as P), and corner parts or cross points, which are characteristic points in the image, are extracted as many as required as tracking points ($A_1, A_2, A_3, \ldots$) (shown by open circles in FIG. 6 (A)).

The tracking points are extracted so that the tracking points are dispersed all over the image, and the characteristic points are extracted also on road surface, which is included in the lower portion of the image.

Figure 5:
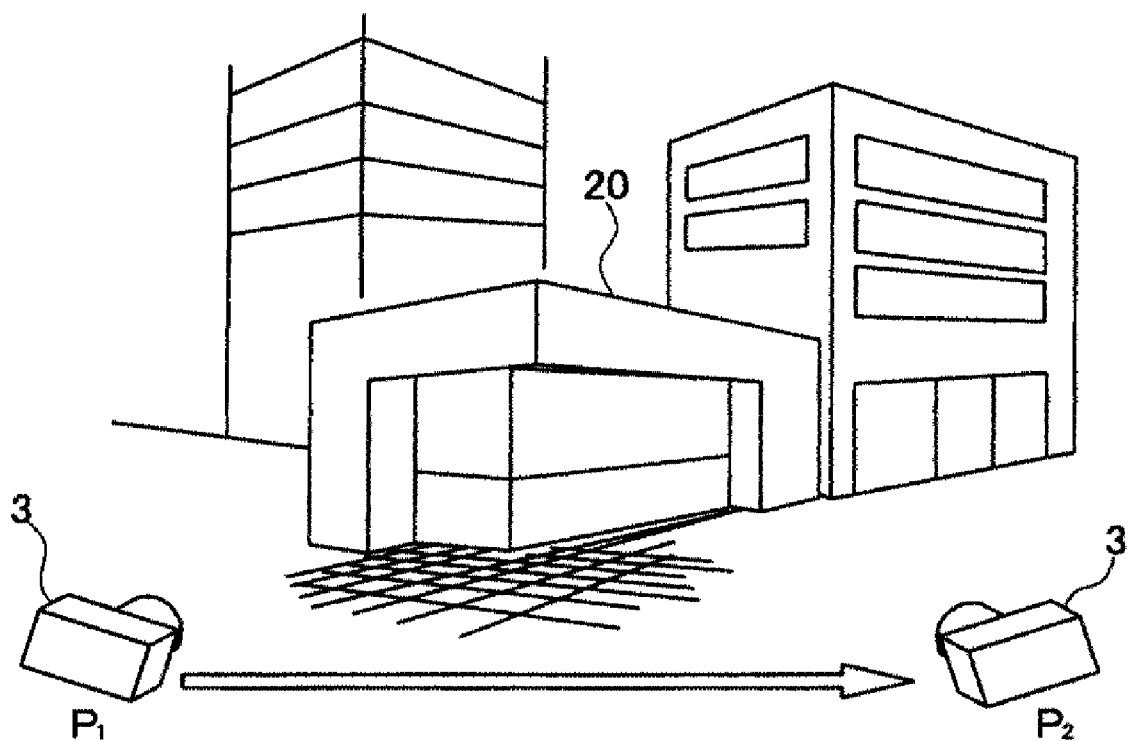
FIG. 5 is a drawing to explain a condition of image pickup in an image tracking operation of the position measuring instrument.
Figure 6A:
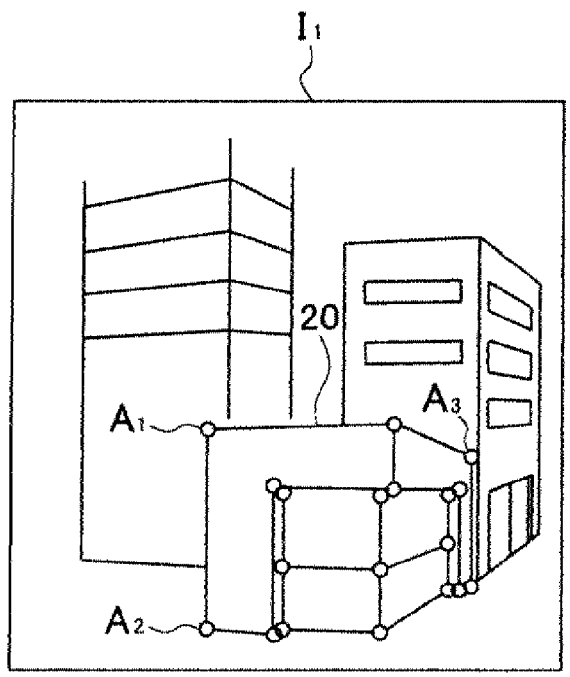
FIG. 6 (A) and FIG. 6 (B) each represents a drawing to show an image obtained.
Figure 6B:
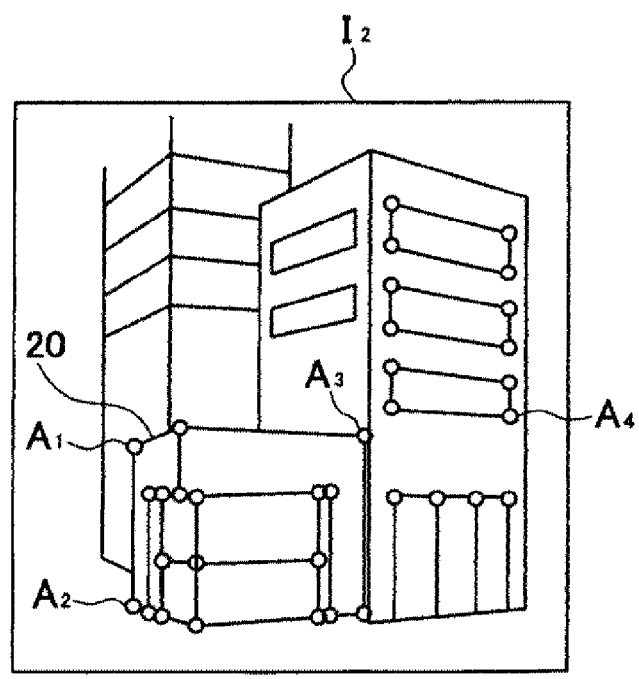

An image as taken at $P_1$ in FIG. 5 is shown by the image $I_1$ in FIG. 6 (A), and an image of $P_2$ continuously taken while moving from $P_1$ to $P_2$ in FIG. 5 is shown by the image $I_2$ in FIG. 6 (B).

In this case, the azimuth of the center of the image data $I_1$ from $P_1$ is obtained by the azimuth detected by the azimuth sensor 10, and the azimuth from each of the tracking points ($A_1, A_2, A_3, \ldots$) can be calculated from the position of pixels in the image data $I_1$ (position on the image pickup element with respect to the center of the image).

In the process from $P_1$ to $P_2$, images are taken continuously by the image pickup device 9 and the tracking point generated in each image are tracked between the adjacent images.

The position of the tracking point set as an object of tracking on the image pickup element is memorized as a retrieval center position. On a subsequent image data as subsequently next acquired over time, a retrieval range is set up with a position of the retrieval center as a center, and the tracking point is retrieved in the subsequent image data over the retrieval range as set up. As described above, the images are taken continuously during the moving, and deviation of the preceding image data from the subsequent image data is slight. The tracking point is present within the retrieval range of the subsequent image data, and the tracking point in the subsequent image data can be immediately identified. For the retrieval within the retrieval range, SSDA (Sequential Similarity Detection Algorithm) or area correlation method or the like is adopted.

The tracking point is identified on the subsequent image data as retrieval object and the tracking point of the preceding image data is checked by back-matching. When the tracking point obtained by the back-matching does not concur with the tracking point already obtained, this tracking point is deleted. By carrying out the back-matching, occlusion or obstacle can be avoided. When the tracking points are determined on 3 or more image data, coordinates are repeatedly checked by bundle adjustment calculation based on a plurality of images, and the tracking points with low accuracy are removed. By removing the tracking points with low accuracy, it is possible to improve the accuracy to identify the tracking points.

By comparing the preceding image data with the subsequent image data, the tracking points as given above are sequentially retrieved according to time series.

The extract of the tracking point by the image processing and the tracking of the tracking point are continuously carried out regardless of whether positional data is inputted or not from the position detecting device 3 at each P. The image data in the past, for which tracking procedure of the tracking points has been completed (i.e. the image data taken between these P's), may be erased from the data storage unit 18 to reduce the amount of memorizing.

When image tracking is performed, it is preferable that an object in common is present between image frames. When there is a space between the buildings or a building is lacking, no object in common is present. As a result, image tracking may be stopped or the tracking point being tracked may be erroneously recognized.

In the present embodiment, road surface is included in a part of the image, and the continuity of the road surface on the image can be maintained. Further, tracking points are generated on the road surface. Therefore, by regarding the tracking point extracted from the image on the road surface as an object of the image tracking, image tracking can be reliably continued even when there is a space between buildings or when a building is lacking.

Next, when the mobile object 25 is moved behind the building or is moved into a tunnel, radio waves from the satellite do not reach, and the position measurement by the GPS position detecting device 7 cannot be performed. Then, the position measurement by the method of intersection and the method of resection are continuously performed.

Now, referring to FIG. 7 to FIG. 10, concrete description will be given on a case where position measurement of the mobile object 25 is carried out by sequentially repeating the method of intersection and the method of resection.

Figure 7:
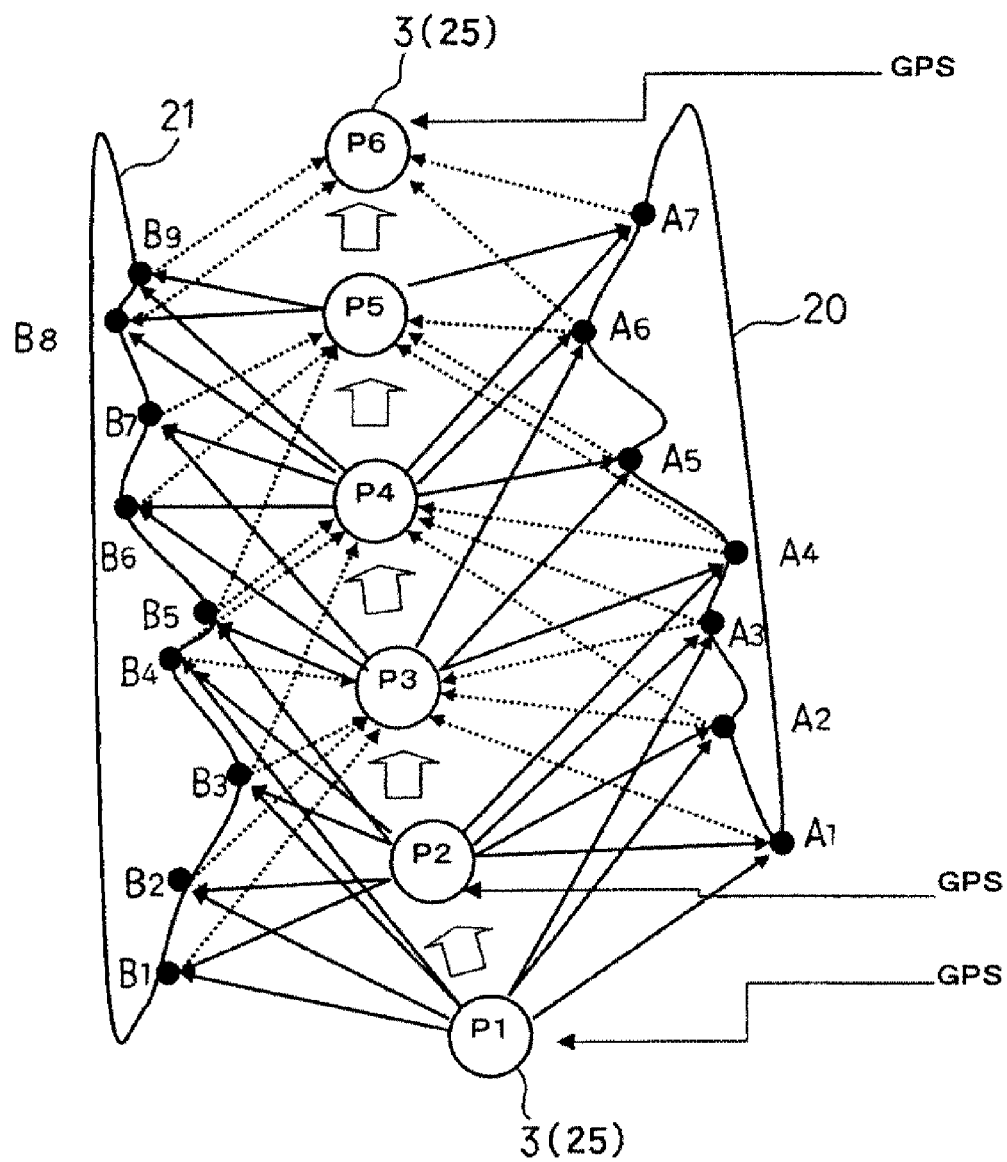
FIG. 7 is a drawing to explain conditions of measurements based on a method of intersection and on a method of resection in the embodiment of the present invention.

FIG. 7 shows a condition where the mobile object 25 is moved between an obstacle 20 and an obstacle 21, and the position detecting device 3 moves from a first point (point $P_1$) to a sixth point (point $P_6$) (hereinafter, the point P is simply referred as P). At the points $P_1$ and $P_2$, signals from the satellite can be received via the GPS antenna 11, while, at the points $P_3$ to $P_5$, signals from the satellite cannot be received because of the obstacles 20 and 21, and at the point $P_6$, signals from the satellite can be received again.

During the time period when the mobile object 25 is moving, the images in the surroundings, i.e. the images of the obstacles 20 and 21, are continuously taken by the image pickup device 9, and the image tracking as described above is performed. Each of the points P's indicates the position of the mobile object 25 at each time interval set in advance or at a predetermined image frame interval. The distance between the points P's is a photographing base line length B as to be described later.

When the mobile object 25 comes to the point $P_1$, the control arithmetic unit 14 acquires a position data measured at the GPS position detecting device 7 (Step 21). Therefore, the point $P_1$ has the coordinates already known.

Next, on the point $P_2$, position measurement is performed by the GPS position detecting device 7. Position measurement data on the point $P_2$ is inputted from the position detecting device 3 (Step 23), and the position measuring data of the point $P_2$ and the image $I_2$ taken at the point $P_2$ are stored in the data storage unit 18 (see FIG. 6). Image processing is carried out on the image $I_2$, and each of the tracking points ($A_1, A_2, A_3, \ldots$) are identified by tracking. An azimuth of each of the tracking points ($A_1, A_2, A_3, \ldots$) with respect to the point $P_2$ in this case can be calculated according to detection of azimuth in image pickup direction by the azimuth sensor 10 and to the position (field angle) of the image $I_2$ of each of the tracking points ($A_1, A_2, A_3, \ldots$) (see FIG. 8 (A)).

Figure 4:
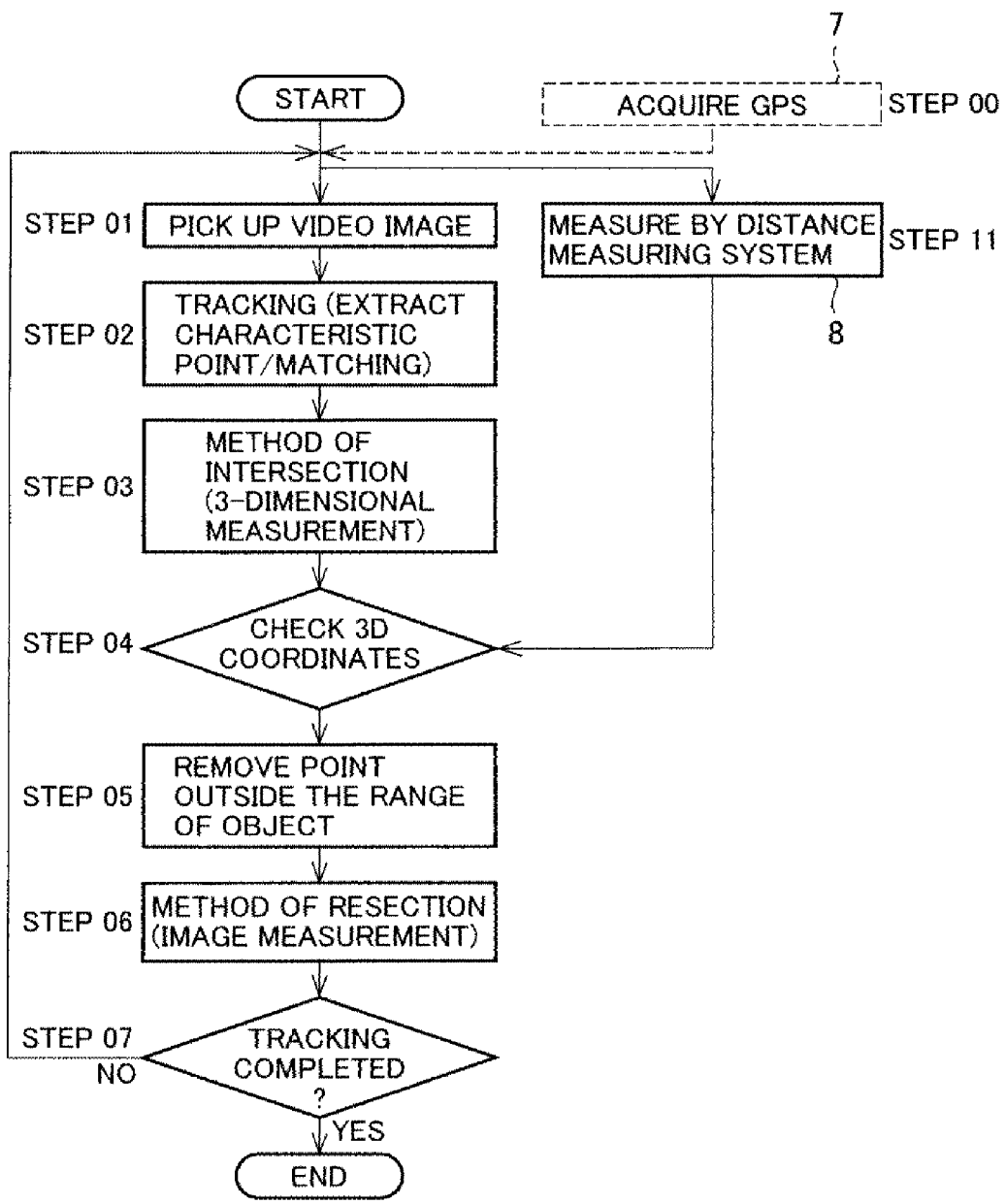
FIG. 4 is a flowchart to show operation in the embodiment of the present invention.
Figure 8A:
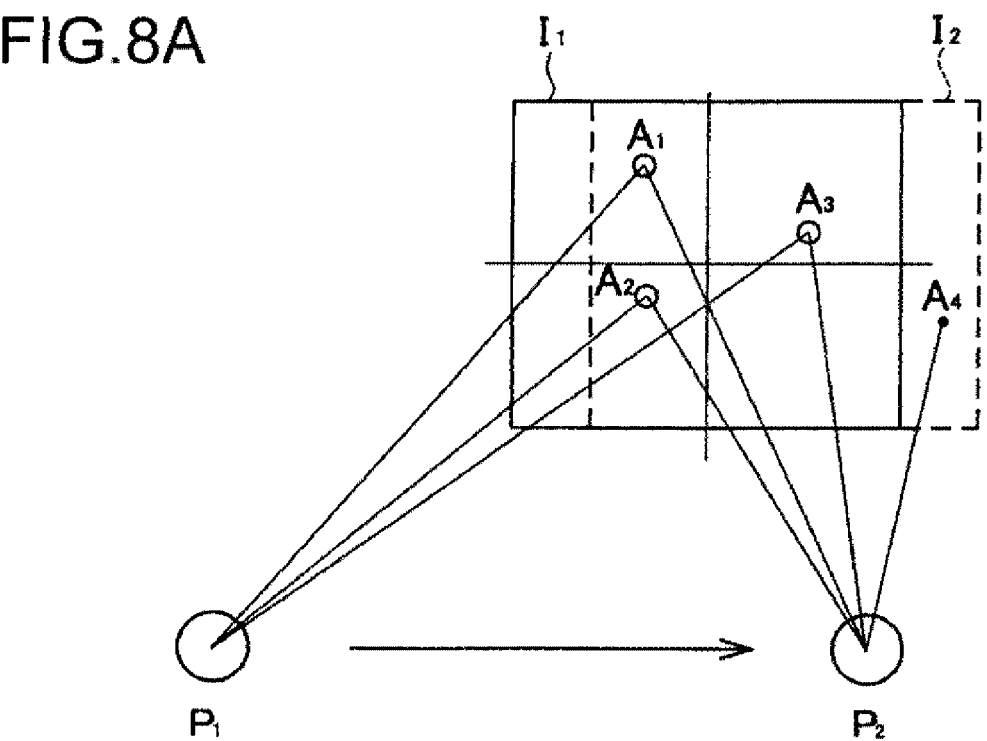
FIG. 8 (A) is a drawing to explain position measurement for tracking points by the method of intersection according to the image obtained, and FIG. 8 (B) is a drawing to explain position measurement for an image pickup point by the method of resection based on the image obtained.
Figure 8B:
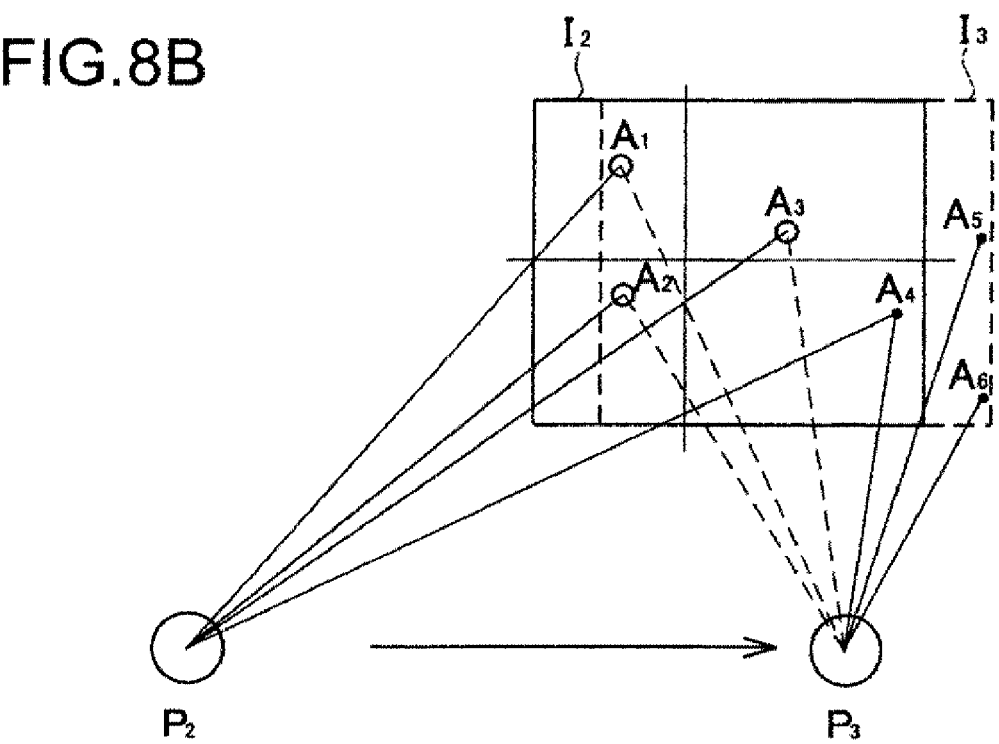
Figure 9:
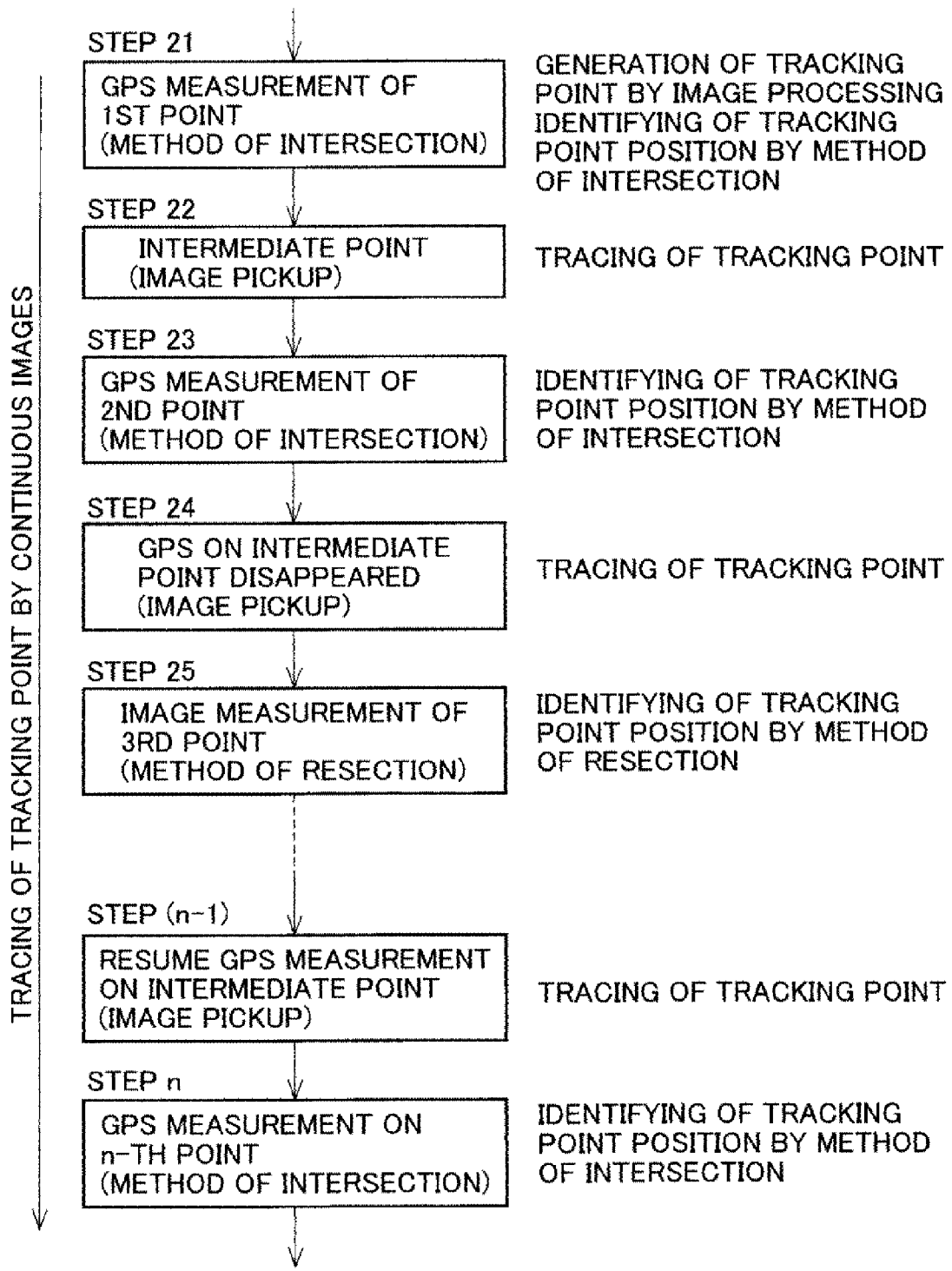
FIG. 9 is a flowchart to explain operation of measurement by the method of intersection and the method of resection in the embodiment of the present invention.

Next, based on the positional data of the points $P_1$ and $P_2$, which are known points, and also, based on azimuth angle of each of the tracking points ($A_1, A_2, A_3, \ldots$), three-dimensional positional data of each of the tracking points ($A_1, A_2, A_3, \ldots$) can be calculated by the method of intersection (Step 23 and Step 03) (See FIG. 8 (A) and FIG. 4).

As described already, regarding to this calculated three-dimensional positional data, it is judged whether the calculation results are valid or not, and further, whether the calculation results should be further obtained or should be exempted through comparison with the results of distance measurement by the laser distance measuring device 8 (Step 05; see FIG. 4).

If the calculation results are judged as valid and it is judged that the calculation results are acquired, the tracking points ($A_1, A_2, A_3, \ldots$) will be the known points. In FIG. 8, only a limited number of tracking points are shown, while a multiple of tracking points are extracted actually. Thus, even when a part of the tracking points is exempted, the image tracking can be performed by remaining tracking points. For instance, by the tracking points extracted on the images on the road surface, the image tracking can be carried out.

The positional data of each of the tracking points ($A_1, A_2, A_3, \ldots$) are associated with the image data of the images $I_1$ and $I_2$ and are stored in the data storage unit 18. For the tracking points, relative orientation of the images $I_1$ and $I_2$ is performed as the tracking points ($A_1, A_2, A_3, \ldots$), and the images $I_1$ and $I_2$ are turned to the images including three-dimensional positional data (stereo image).

When the mobile object 25 is moved to the point $P_3$, radio waves from the satellite are interrupted by the obstacle 20. Position measurement cannot be performed on the position detecting device 3, and the measuring position from the position detecting device 3 is not inputted. When it is judged that there is no input from the position detecting device 3, the control arithmetic unit 14 changes over to the position measurement by calculation based on the method of resection.

Until the mobile object 25 is moved to the point $P_3$, the image pickup operation and the tracking operation of the tracking points in the image data by the image pickup device 9 are continuously performed (Step 24).

Specifically, based on the positional data of each of the tracking points ($A_1, A_2, A_3, \ldots$) already obtained and also on the data of azimuth of the tracking points ($A_1, A_2, A_3, \ldots$) in the image $I_3$ acquired at the point $P_3$ and on the data of azimuth of $P_3$ (azimuth and field angle in image pickup direction), positional data at the point $P_3$ is calculated by the method of resection (Steps 25 and 06) (See FIG. 8 (B) and FIG. 4).

When the mobile object 25 is moved to the points $P_1$, $P_2$, $P_3 \ldots$ and the range of image pickup is moved, new tracking points are sequentially generated in the picked-up images. For instance, referring to FIG. 8 (A) and FIG. 8 (B), a tracking point $A_4$ is generated on the image $I_2$ and a tracking point $A_5$ and $A_6$ are generated on the image $I_3$. Tracking operation is also performed on the tracking points newly generated (Step n−1), and further, positional data is calculated and measured sequentially by the method of intersection.

By the method of resection, the point $P_3$ is turned to a known point, and the position of the tracking point newly generated is calculated by the method of intersection based on the positional data of the point $P_3$ and $P_2$ and also based on azimuth data with respect to the tracking points newly generated from the points $P_3$ and $P_2$ (Step n).

From the positional data of the tracking points in the image, a position of $P_n$ is calculated and measured by the method of resection. Further, the position of the tracking points newly generated from the data $P_{(n-1)}$ and $P_n$, which are now known, is calculated and determined by the method of intersection based on the image. Even when radio waves from the satellite cannot be obtained and position measurement of the point P cannot be performed by the position detecting device 3, position measurement of the point P can be continuously performed by alternately carrying out the method of intersection and the method of resection.

Next, when the mobile object 25 reaches the point $P_6$, radio waves form the satellite can be received, and the position of the point $P_6$ can be measured by the position detecting device 3. When the positional data measured by the position detecting device 3 is inputted to the control arithmetic unit 14, the control arithmetic unit 14 judges that there is an input of positional data, and the calculation by the method of resection is stopped. The image data taken by the image pickup device 9, the tracking point extracted by the image data, and the azimuth data of the extracted tracking point are associated with the positional data of the point $P_6$, and the associated data is stored in the data storage unit 18.

Therefore, as far as the positional information from the position detecting device 3 is being inputted, the results measured at the position detecting device 3 is adopted as the data of the position measurement of P. When the positional information from the position detecting device 3 is interrupted, the positional information of the point P calculated by the method of intersection and the method of resection is adopted, and the position of the point P is measured continuously without interruption.

In case position measurement cannot be made by the position detecting device 3, as the image data and the data of the tracking points, it would suffice if there are the data on three points P's, i.e. a newest point $P_n$, and at least two points in the past, $P_{(n-1)}$ and $P_{(n-2)}$. The data older than the $P_{(n-3)}$ may be sequentially erased to reduce the amount of memorizing.

Images are captured at the two adjacent measuring points, e.g. on $P_2$ and $P_3$ according to as many tracking points as required, which were tracked, relative orientation is performed on pass points based on the tracking points to the images acquired at $P_2$ and $P_3$. If the images captured at $P_2$ and $P_3$ are regarded as images including three-dimensional positional data (i.e. stereo images), it is possible to obtain positional data and azimuth data of each pixel to constitute the other images from the image, and it is possible to speed up calculation processing.

In the description as given above, an image is taken on an obstacle on a right side of the mobile object 25 in FIG. 7, and the position measurement is performed on P. In case an adequate image cannot be acquired to obtain the tracking points from the obstacle on the right side, the image may be acquired from the obstacle on a left side, and adequate selection may be made in the stage of image processing, depending on condition of the obstacle on the image to be acquired.

In Step 04 and Step 25, the measuring position P is obtained by the method of resection, while, in the present embodiment, matching is made on the coordinates of a known point (a measuring point) and on image by single photographic orientation, and the measuring position P is measured.

Figure 10:
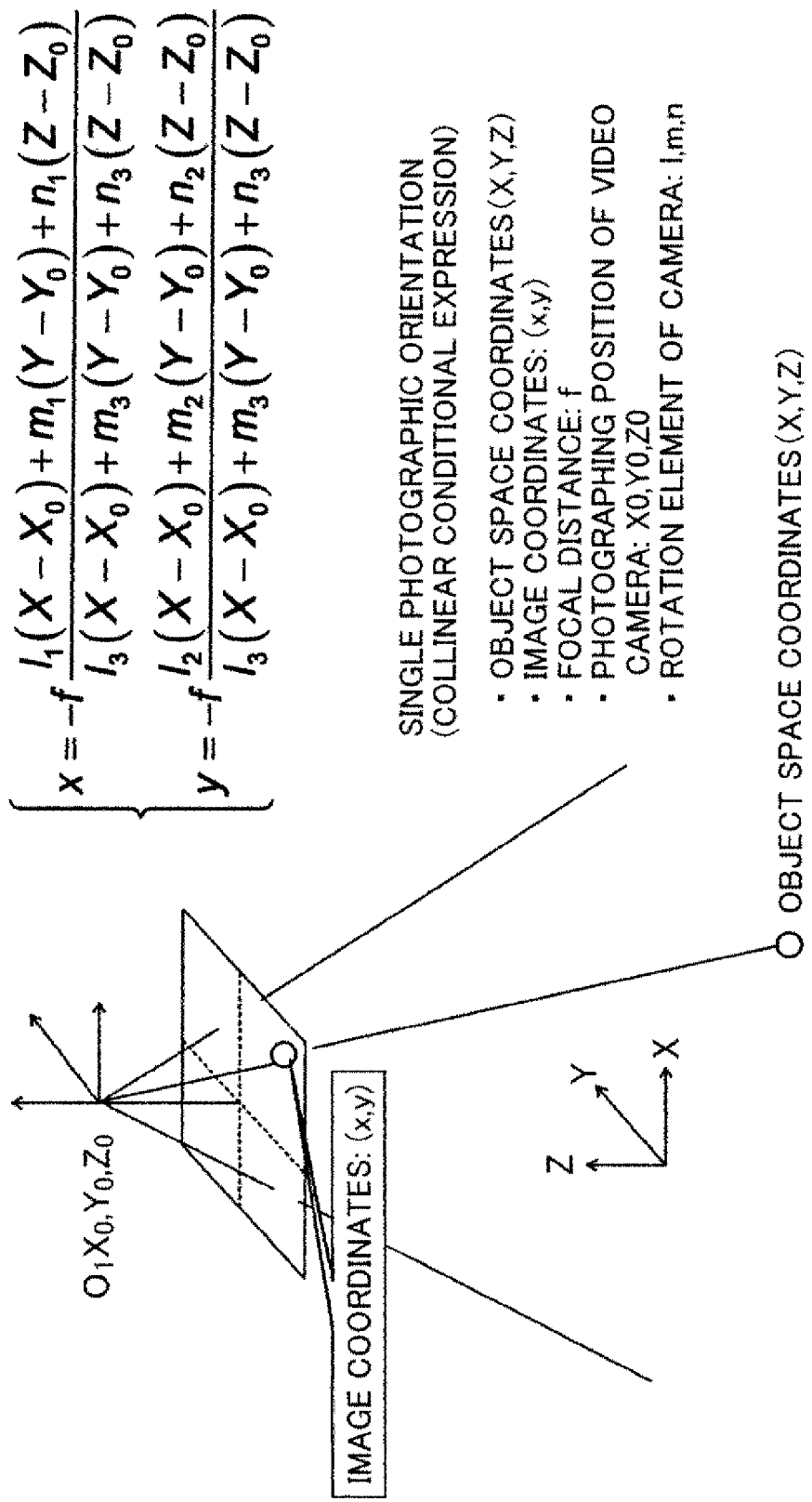
FIG. 10 represents a drawing and equations to explain single photographic orientation.

Referring to FIG. 10, description will be given below on the measurement of coordinates of the measuring point by single photographic orientation.

It is supposed here that coordinates of a space including the measuring point are object space coordinates (X,Y,Z), image coordinates on the image are (x,y), a focal distance of the image pickup device 9 is f, coordinates of the photographing position of the image pickup device 9 are $(X_0,Y_0,Z_0)$, and rotation element (tilting) of camera is (l,m,n). Then, the object space coordinates (X,Y,Z) and image coordinates (x,y) are expressed by the following equations:

$$x=-f[l_1(X-X_0)+m_1(Y-Y_0)+n_1(Z-Z_0)]/[l_3(X-X_0)+m_3(Y-Y_0)+n_3(Z-Z_0)]$$

$$y=-f[l_2(X-X_0)+m_2(Y-Y_0)+n_2(Z-Z_0)]/[l_3(X-X_0)+m_3(Y-Y_0)+n_3(Z-Z_0)]$$

Therefore, if there are two or more (or, more preferably three or more) known object space coordinates (X,Y,Z), three-dimensional coordinates of the coordinates $(X_0,Y_0,Z_0)$ of the photographing position of the image pickup device 9 can be measured.

Next, referring to FIG. 11 to FIG. 13, description will be given on general features of image tracking and distance measurement in the present embodiment of the invention.

Figure 11:
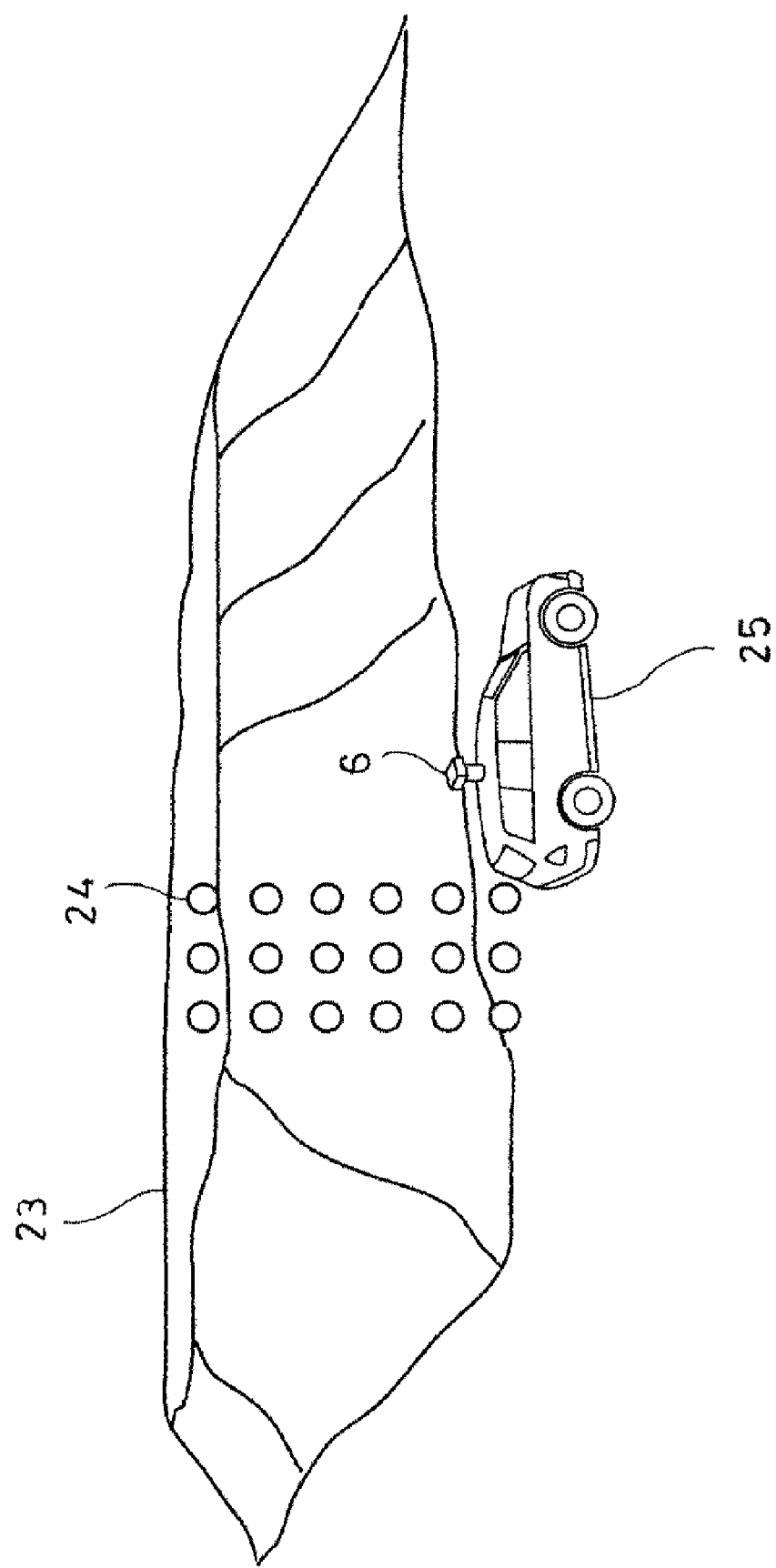
FIG. 11 is an illustration to explain a relation between image tracking and distance measurement in the embodiment of the present invention.
Figure 12:
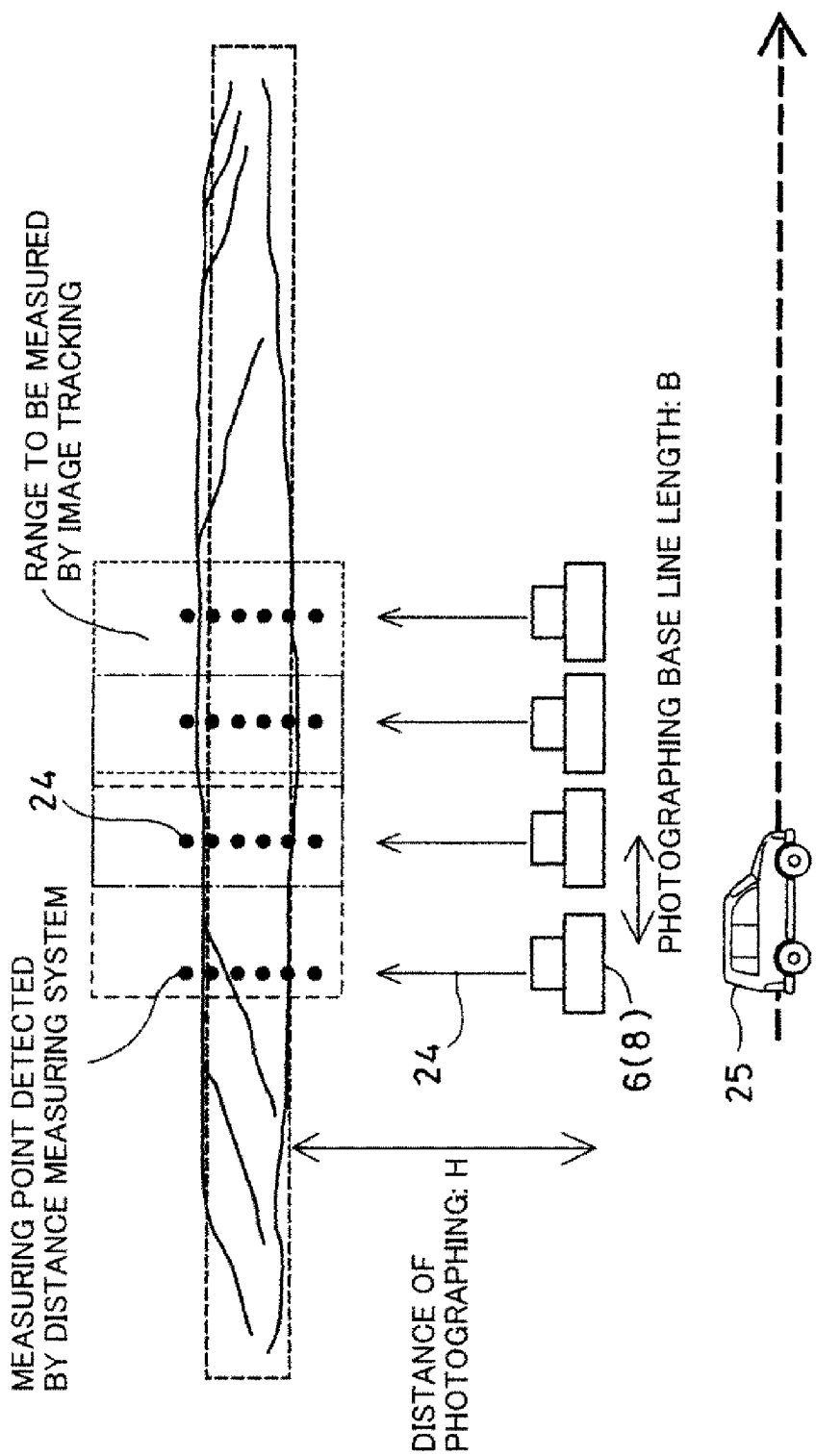
FIG. 12 shows drawings to explain the relation between the image tracking and the distance measurement in the embodiment of the present invention.
Figure 13:
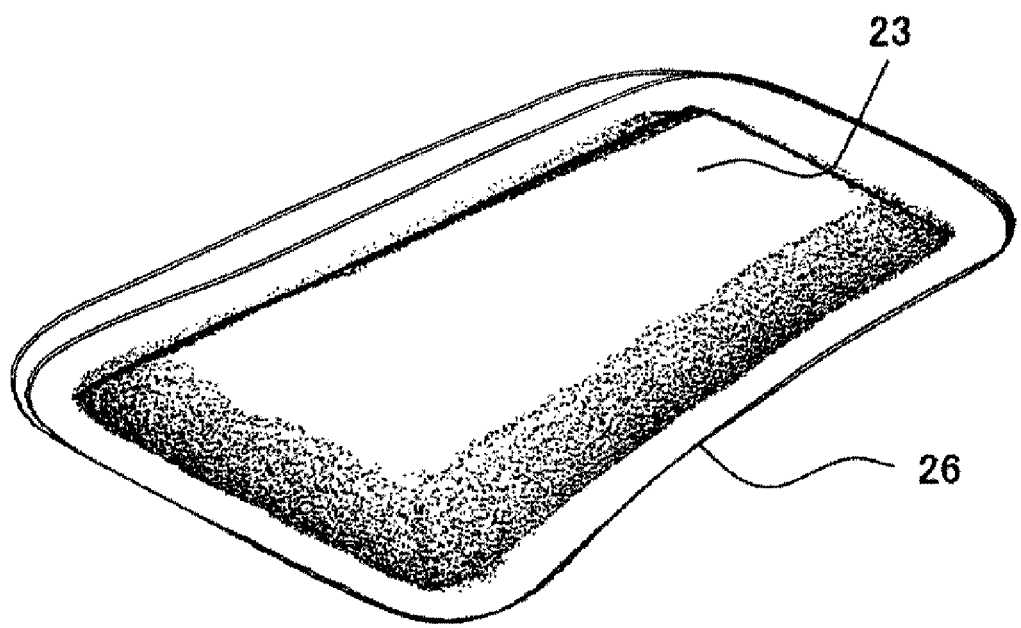
FIG. 13 is a drawing to explain loci of measuring points of an object to be measured and a mobile object, for which measurement is made, as obtained in the embodiment of the present invention.

In the examples shown in each of FIG. 11 to FIG. 13, a detecting device main unit 6 is installed on a roof of a mobile object 25, which is a vehicle, and measurement is performed on a fill-up ground (earth laid on the ground) 23.

The measurement is performed while the mobile object 25 is moving around the fill-up ground 23. Moving images of the fill-up ground 23 are taken by the detecting device main unit 6, and distance measurement is carried out by the laser distance measuring device 8. As shown in FIG. 12, the ground surface on this side of the fill-up ground 23 is also included in the moving images.

From the laser distance measuring device 8, a plurality of laser beams 24 aligned along a line with a predetermined distance between them in up-to-bottom direction are projected in pulses. By the pulsed laser beam, distance is measured for each beam and for each pulse. Because the mobile object 25 is moved while projecting the laser beams 24 aligned along the line, the range of measurement is in band-like shape with width in up-to-bottom direction.

The laser distance measuring device 8 may project single pulsed laser beam reciprocally in up-to-bottom direction for scanning to measure the distance for each pulse, while, by using a plurality of pulsed laser beams to measure the distance, not only the distance to the object can be measured but also a plane to be measured can be identified. By determining the range of measurement from the result of distance measurement of the laser distance measuring device 8, it is possible to omit the measurement of unnecessary portions, and measuring efficiency is improved. Also, the burden on the position measuring instrument 1 during the measurement can be reduced.

As shown in FIG. 12, while the image tracking is carried out, the images are captured for each predetermined time interval or for each predetermined frame interval. The captured images are associated with the distance measurement data measured by the laser distance measuring device 8 at the time of image capturing and are stored. A moving distance of the mobile object 25 during the time difference between the captured images will be the photographing base line length B. A photographing distance H in this case corresponds to Z as shown in FIG. 10.

In FIG. 13, the measured points on the fill-up ground 23 are represented as a multiple of point groups. Numeral 26 represents running loci of the mobile object 25 as measured in the present embodiment. For the measurement of the running loci 26 shown in FIG. 13, position measurement by the GPS position detecting device 7 is not performed.

According to the present invention, from the distance data measured by the laser distance measuring device 8, a range of measurement for carrying out the image tracking is set up, and three-dimensional coordinates of the object as obtained from the image tracking by the image pickup device 9 are checked, and the data within this range is detected. As a result, working efficiency can be improved, and accuracy and reliability of the measurement can also be improved.

By using the distance data actually measured, only three-dimensional positional data measured at an adequate photographing distance can be obtained. By using the method of resection using video camera, external orientation elements (position and tilting) of the video camera can be determined with high accuracy without being influenced by the photographing distance caused by configuration of the object.

Further, even in case the object to be measured cannot be detected due to concealment of surface irregularities or discontinuity of the object, errors of three-dimensional positional data can be eliminated from the results of image tracking by defining the measurement surface, and errors in the external orientation elements of video camera due to the method of resection can be prevented.

By performing calibration on the laser distance measuring device 8 and the video camera in advance, self-calibration of video camera lens can be simply carried out from the three-dimensional coordinates obtained by the laser distance measuring device 8 and from the image data corresponding to the coordinates. As a result, it is possible to improve the accuracy in the tracking by the video camera.

In case image tracking cannot be performed, e.g. at nighttime, three-dimensional measurement can be interpolated by the laser distance measuring device 8.

The invention claimed is:

1. A position measuring method for measuring a moving image pickup position and for measuring an object of image pickup from the image pickup position, wherein a method of intersection and a method of resection are alternately and repeatedly carried out, said method of intersection is used to continuously take digital images, to generate tracking point in the image, to perform tracking on moving image and to measure coordinates of said tracking point from coordinates of the image pickup position used as a known point by calculation, said method of resection is used to measure the image pickup position after moving from coordinates of the tracking point obtained by calculation, comprising a step of measuring actually a distance to an object of image pickup by laser surveying in parallel to image pickup of the digital image, a step of comparing coordinates of said tracking point obtained by calculation with the distance obtained by actual measurement, and a step of acquiring a calculating coordinate as coordinate value of the tracking point in case said calculating coordinate obtained by calculation is within a predetermined limit of errors to the actually measured distance.

2. A position measuring method according to claim 1, further comprising a step of moving a plurality of points in up-to-bottom direction while performing laser surveying, and a step of setting a range of measurement for performing the tracking of the moving image.

3. A position measuring method according to claim 1, further comprising a step of including road surface or ground surface in a part of the moving image to be taken, a step of extracting the tracking point also from images of said road surface or said ground surface, and a step of continuing tracking of the moving image by the images of said road surface or said ground surface when the object of image pickup is not present.

4. A position measuring instrument, comprising a GPS position detecting device, an image pickup device for continuously taking a digital image, a laser distance measuring device, and a measuring instrument main unit, wherein said GPS position detecting device measures positional data at a first point and a second point, said image pickup device continuously takes digital images on sceneries in surroundings during a process where the image pickup device moves from the first point, which is a known point, via the second point to a third point, which is an unknown point, said laser distance measuring device measures a distance to the object of image pickup in parallel to the image pickup by said image pickup device, and said measuring instrument main unit generates tracking point from the image obtained at the first point, sequentially identifies said tracking points from the tracing of points generated on the images to be acquired continuously, calculates three-dimensional positional data of the tracking points of the images acquired at the first point and the images acquired at the second point from the positional data at the first point and the second point, compares the result of calculation with the result of distance measurement by said laser distance measuring device, adopts the result of calculation within a predetermined limit of errors with respect to said measurement results as positional data of said tracking point, and calculates positional data of said third point from the positional data of said tracking point.

5. A position measuring instrument according to claim 4, wherein said laser distance measuring device can perform measurements on a plurality of points in up-to-bottom direction at the same time or almost at the same time.

6. A position measuring instrument according to claim 4, wherein said laser distance measuring device projects a plurality of pulsed laser beams with aligned along a line in up-to-bottom direction with a predetermined distance between them, and distance measurement is performed for each laser beam and for each pulse of each laser beam.

7. A position measuring instrument according to claim 4, wherein said laser distance measuring device projects a single pulsed laser beam reciprocally in up-to-bottom direction for scanning, and measures distance for each pulse.

8. A position measuring instrument according to one of claims 5 to 7, wherein said measuring instrument main unit sets up a range of measurement based on the result of measurement by said laser distance measuring device and carries out tracking on the moving image and measurement on said range of measurement.

* * * * *